United States Patent [19]

Nakano et al.

[11] 4,268,838
[45] May 19, 1981

[54] THERMAL RECORDING SYSTEM

[75] Inventors: Kazuo Nakano; Toshiyuki Iwabuchi; Ichiji Yamamoto, all of Tokyo, Japan

[73] Assignee: OKI Electric Industry Co., Ltd., Tokyo, Japan

[21] Appl. No.: 57,976

[22] Filed: Jul. 16, 1979

[30] Foreign Application Priority Data

Jul. 18, 1978 [JP] Japan ................................. 53-86772
Jul. 20, 1978 [JP] Japan ................................. 53-87752

[51] Int. Cl.³ .......................................... G01D 15/10
[52] U.S. Cl. .............................. 346/76 PH; 219/216; 400/120
[58] Field of Search ................... 346/76 PH; 219/216; 400/120; 323/19, 25

[56] References Cited

U.S. PATENT DOCUMENTS 4,113,391 9/1978 Minowa ..................... 346/76 PH X
4,168,421 9/1979 Ito ............................. 346/76 PH X

*Primary Examiner*—Joseph W. Hartary
*Attorney, Agent, or Firm*—Allan Ratner

[57] ABSTRACT

A thermal recording system in which a thermal treated paper is printed by a thermal head having a series of aligned heat-generating resistor elements and current-holding elements like SCR (thyristor) corresponding to each of said heat-generating resistor elements for holding electric current. The power source for heating said resistor elements is a periodic voltage like a commercial alternate current (A.C.), or a pulsating current which is obtained by rectifying the commercial alternate current. The printing to each cell is accomplished within a single period of said periodic power source, and the duration of heating the resistor elements within said single period is controlled according to the peak voltage or current of the power source, in order to provide the constant concentration or density of printing. Thus, means for converting the peak value of the power source to the time delay is provided. The resistor elements are heated after said time delay in each half cycle of said periodic power source, until the instantaneous voltage or current of the power source reaches zero. Then, the printing concentration is free from the change of the voltage of the power source.

6 Claims, 9 Drawing Figures

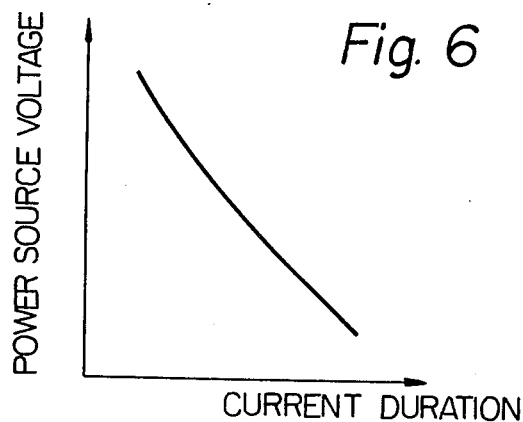
Fig. 6
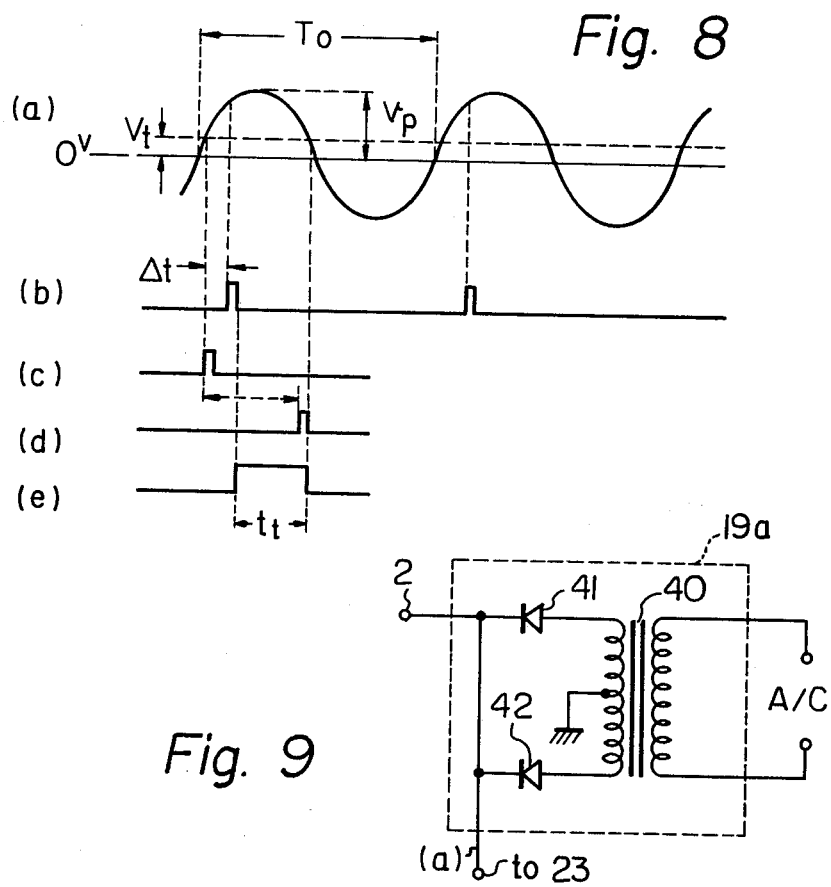
Fig. 8
Fig. 9

THERMAL RECORDING SYSTEM

BACKGROUND OF THE INVENTION

The present invention relates to a thermal recording system, which is particular, relates to an apparatus utilizing the periodic power source. This provides the constant printing concentration or density in spite of the change of the voltage of the power source, in an inexpensive high-speed thermal recording system.

A thermal recording system utilizes a thermal head having a series of aligned heat-generating resistor elements. An electric current is applied to each to the heat-generating resistor elements in accordance with the black or white information of a picture cell to be recorded, so that the Joule heat thus generated in the resistor elements is transferred to a heat-sensitive treated thermal paper in close contact with the thermal head for color formation. Such a heat sensitive recording system has been used in fascimile receiver and/or a computer terminal device and the like. An example of the thermal head and the apparatus for supplying the electric power to said thermal head has been shown in the U.S. Pat. No. 3,609,294.

The heat-sensitive color formation theoretically requires a comparatively long time (about 1 to 10 mS) for recording, so that, when high-speed recording is required a simultaneous multi-dot recording system which simultaneously records a plurality of dots is used. For the simultaneous recording, it is necessary to hold the current through a plurality of elements for a period required by the color formation, and current-holding elements, such as flip-flop circuits, SCR, and/or thyristor circuits, are used for that purpose. Especially, when a very-high-speed recording is desired, the number of elements to be recorded simultaneously is increased, and the number of the corresponding current-holding elements is also required to increase. For example, in the case of a thermal head having heat-generating resistor elements which are aligned along a straight line over the entire recording width of a recording medium, let it be assumed that the recording width is 256 mm, the recording density is 8 dots per mm, the recording time normally required is 10 mS, and the recording time of one line is 40 mS. Then, the total number of the heat-generating resistor elements becomes 8×256=2,048, and the number of recordng operations per one line becomes 40÷10=4. So that in each current application for each recording operation, the electric current through up to 2,048÷4=512 heat-generating resistor elements must be held depending on the picture to be recorded. More particularly, the thermal head with 2,048 pieces of heat-generating resistor elements is divided into four blocks, 512 current-holding elements are successively connected to each block, and the recording system is so constructed as to give 512-bit picture signals. However, the number of the wirings for the signal lines become too large to be practical. Accordingly, an integrated circuit structure has been devised, in which the thermal head, the current-holding elements, and a matrix circuit for arranging input signals thereto in a matrix form to reduce the number of signal lines are integrated.

FIG. 1 illustrates a simplified schematic diagram of an example of the previously mentioned thermal head, which uses thyristors (SCR) as the current-holding elements and a matrix circuit comprising AND circuits as input circuits for the gates of the thyristors. In FIG. 1, a plurality of heat-generating resistor elements 1 are aligned along a straight line, and one side terminals of all the heat-generating resistor elements are connected in common to a power source terminal 2. The opposite side terminals of the heat-generating resistor elements 1 are connected to anodes (A) of thyristors 3 respectively, and the cathodes (K) of all the thyristors 3 are connected to an earth terminal 4 in common. The gates (G) of the thyristors 3 are connected to the joints of resistors 5 and anodes of two diodes 6 and 7, while the opposite ends of all the resistors 5 are connected to a bias voltage source terminal 8 in common. The cathodes of the diodes 7 are grouped by consecutive n pieces in common and connected to selector terminals 9, as shown in the figure. The cathodes of the other diodes 6 are grouped by taking every n'th pieces in common and connected to driver terminals 10, as shown in the figure. Accordingly, if there are a pieces of the heat-generating resistance elements in total, then the number m of the selector terminals 9 will be m=a/n, and the input signals in this example are arranged in the form of an m×n matrix.

It is noted here that, as apparent from the foregoing illustration, if the total number of the heat-generating resistance elements 1 in the thermal head is a, then the total number of the thyristors 3, the total number of the resistors 5, the total number of the diodes 6, and the total number of the diodes 7 will be also a, respectively. As regards the number of the input lines, there is one power source terminal 2, one earth terminal 4, one bias voltage source terminal 8, the selector terminals 9 (m lines), and the driver terminals 10 (n lines), so that (m=n=3) lines in total.

The illustrated example of the thermal head is of hybrid-type IC (integrated circuit) construction, which comprises the heat-generating resistor elements 1 formed on a ceramic substrate by a thin or a thick film and aligned along a straight line; m pieces of silicon chip IC are mounted on the aforesaid ceramic substrate, each of which silicon chip IC includes n circuit groups integrated thereon, each of the said circuit groups consisting of one of the thyristors 3, one of the resistors 5, one of the diodes 6, and one of the diodes 7; and three-dimensional wirings which provide connections relating to the diodes 6 and 7.

It should be noted in FIG. 1 that a pair of diodes 6 and 7 operate as an AND circuit, which provides the output signal only when one of the selector terminals 9 and one of the driver terminals 10 are simultaneously supplied the input signals. When the AND circuit composed of the pair of diodes 6 and 7 provides the output signal, the relating thyristor 3 connected to the opened AND circuit is conducted and then the relating resistor element 1 is heated by the electric current which flows from the power source terminal 2 through the resistor elements 1, and the thyristor 3 to the earth terminal 4.

Preferably, the value (m) is 64, and the value (n) is 32, thus, the number of the resistor elements in a whole horizontal dot line is (m)×(n)=64×32=2,048.

FIG. 2 shows the outline of an example of circuits for driving the thermal head of FIG. 1. The operation of the thermal head will be described by referring to FIG. 2.

Picture signals 11 are time sequentially applied to a shift register 14 which has n number of bit position, in the order of the alignment of the heat-generating resistor elements 1 (FIG. 1) in the thermal head 12 (The thermal head 12 is the same as that shown in FIG. 1). Clock signals 13 corresponding to each picture element (dot) of the picture signals 11 are applied to the clock terminal of the shift register 14, while the aforesaid picture signals 11 are applied to the serial input terminal of the shift register 14, so as to be successively stored therein in accordance with the clock signals 13. The shift register has n steps, and the output from those steps are successively connected to the driver terminals 10 of the thermal head 12 so as to match the alignment of the corresponding heat-generating resistor elements 1 (for n lines). The clock signals 13 are also applied to a counter 15, and upon counting n clock signals, the counter 15 generates a carrier signal 16 which is similar to one clock signal, and the carrier signal 16 is applied to another counter 17. The outputs from different steps of the counter 17 are connected to a decoder 18, and the outputs from the decoder 18 are successively connected to the selector terminals 9 of the thermal head 12 so as to match the alignment of the corresponding heat-generating resistor elements 1 (for m lines).

The power source terminal 2 of the thermal head 12 is connected to one end of the secondary winding of a transformer 19 for transforming the commercial AC power source voltage to a level required by the thermal head. A detector circuit 20 is also connected to the power source terminal 2, for checking whether the voltage at the power source terminal 2 is above the holding voltage for ensuring the holding current of the then conductive thyristor 3. The output 21 from the detector circuit 20 is connected to a control circuit (not shown), which triggers the picture signal 11 and the clock signal 13 upon detection of the output of the detector circuit 20.

The bias voltage source terminal 8 of the thermal head 12 is connected to the positive polarity terminal of a bias DC voltage source 22. The earth terminal 4 of the thermal head 12, the other end of the secondary winding of the transformer 19, and the negative polarity (earth) terminal of the bias voltage source 22 are commonly connected to the earth line (the grounded symbol of the figure) of the illustrated circuit.

In the operation of the circuit of FIG. 2, the detector 20 informs, upon detection, the control circuit that the voltage of the power source terminal 22 has increased above the holding voltage for ensuring the holding current of the thyristor 3. Accordingly, the control circuit causes the picture signals 11, which alternatively assumes one of black/white two levels, i.e., "0" level for white and "1" level for black, to be applied to the circuit of FIG. 2 simultaneously with the clock signals 13, so that the data representing n picture elements of the picture signals are stored in the shift register 14. At this moment, the counter 15 produces a carrier signal 16, indicating that picture elements are stored in the shift register 14 to its full capacity. The counter 17 is actuated for causing the decoder 18 to produce a pulse signal at one of the output lines thereof.

In the case of the thermal head of FIG. 1, if it is assumed that the picture signals are applied to the heat-generating resistor elements 1 in succession starting from the extreme left element of the figure. The first pulse signal from the decoder 18 is applied to that output line thereof which corresponds to the selector terminal 9 relating to the extreme left group heat-generating resistor elements of FIG. 1. Regarding the output signals from the shift register 14, the right side steps of the shift register 14 of FIG. 2 are connected to those driver terminals 10 which relate to the left side heat-generating register elements of FIG. 1, so that those picture signals 11 which are applied to the shift register 14 time-wise earlier correspond to the left side heat-generating register elements of FIG. 1.

When the pulse signals are applied to the selector terminal 9 and the driver terminal 10, the AND condition of the AND circuit composed of the diodes 6 and 7 are satisfied. When this occurs, the output signal of said AND circuit is applied to the gate terminal (G) of the thyristor 3, then said thyristor 3 is turned on.

On the other hand, those thyristors with which thyristors the contents of the shift register 14 do not meet the aforesaid AND conditions, are retained in an OFF state. When the data of the picture signals 11 corresponding to the next n picture elements are stored in the shift register 14, the decoder 18 similarly generates another pulse signal at the output. This pulse signal is now applied to the selector terminal 9 relating to the second group thyristors from the extreme left as seen in FIG. 1 (as a result of the counting by the counter 17).

Accordingly, the picture signals of n picture elements at this moment relate to the n picture elements of the second group thyristors from the extreme left, so that the thyristors 3 belonging to said second group are either turned ON or kept Off. Other thyristors 3 are successively triggered group by group in a similar manner. Thus, for instance, 512 picture signals 11 are applied to and held by the thyristors 3. Then, the voltage at the power source terminal 2 changes along the positive half cycle of sinusoidal waveform and approaches to 0 V and, the corresponding output signal 21 from the detector circuit 20 is applied to the control circuit. As a result, the then conductive thyristors 3 (corresponding to colored dots) are all turned OFF due to the current reduction below the holding current, so that the picture signals stored in the thyristor 3 are erased. Since the mentioned operations of the shift register 14, the counter 15 and the like can be effected in the high speed electronic circuit in about less than 1 $\mu$S, if it is assumed that the number of the heat-generating resistance elements 1 in one of said groups (the aforesaid n) is assumed to be 32, the operation for one group is finished in 1 $\mu$S $\times$ 32 = 32 $\mu$S. If the number of picture signals to be simultaneously recorded is 512 dots, such picture signals 11 can be set on the thyristors 3 for holding within 1 $\mu$S $\times$ 512 = 512 $\mu$S. If the commercial power frequency is 50 Hz, the duration of one half cycle is 10 mS, which is long enough for ensuring the thermal head to generate heat for recording. Since the relation of 512 $\mu$S < 10 mS is satisfied, the density of color formed for recording is constant and even regardless of the time difference in turning on the different thyristors. This is to say, the time 512 $\mu$S is negligibly short compared with 10 mS, and the operation time for turning on the thyristors 3 does not substantially affect the density of printed color.

In FIG. 3, the waveform (a) is that of the voltage at the power source terminal 2, and the wave form (b), is that of the output 21 from the detector circuit 20. The period of one cycle of the commercially power source voltage is represented by $T_o$, which is 20 mS for the commercial power frequency 50 Hz. The level of the holding voltage at the power source terminal 2 is represented by $V_t$, which level $V_t$ is necessary for passing the holding current through the thyristor 3. Accordingly, the time period $t_v$ is for heat generation by the thermal head 12, and the time period $t_s$ is for erasing the picture signals stored in the thyristors 3 (5 to 10 μS) and for pausing. It is noted here that, in the illustrated waveforms, the time for setting the picture signals on the thyristors 3 (512 μS in the above example) is included in the time period $t_v$.

However, the thermal printer system shown in FIG. 2, has the disadvantage in that the printed concentration or density depends upon the fluctuaton of the voltage of the commercial power source. The voltage of the commercial power source is generally not stable enough as to maintain the constant density of the printed color. If we wish to obtain the constant density of the printed color utilizing the commercial power supply, we must use an expensive automatic voltage regulator in an alternate current stage, or we must use a voltage regulated direct current (DC) power supply. However, both have the disadvantages that their prices are expensive and the size of devices is large.

SUMMARY OF THE INVENTION

It is an objective therefore, of the present invention to overcome the disadvantages and limitations of the prior thermal recording system by providing a new and improved thermal recording system.

Another objective of the present invention, is to provide a thermal recording system in which a constant color concentration or density is obtained in spite of the change in voltage of the power source, while keeping the simple structure of the apparatus.

Still another objective of the present invention is to provide a thermal recording system having means for controlling the duration of heating according to the peak voltage of the power source for providing a constant color concentration or density.

The above and other objectives are attained by a thermal recording system having a thermal head having a plurality of aligned heat-generating resistor elements in contact with a treated thermal paper; current-holding elements corresponding to each of the heat-generating resistor elements for holding electric current; means for applying picture information to said heat-generating resistor elements and current-holding elements in accordance with the picture information to be recorded; a power source for providing the periodic electric power to said thermal head under the control of control means; said control means comprises the peak voltage detector for detecting the peak value of said periodic electric power, a resistor means for storing the digital value of the peak value, the read-only-memory, storing the table for providing the desired delay time in accordance with said peak value, the address of the read-only-memory being defined by the output of said register means; and a counter means in which the initial value is provided by the output of said read-only-memory, while the content of said counter means is decreased one after another by a predetermined clock pulse, and the output of said counter means controls the power supply to the thermal head.

BRIEF DESCRIPTION OF THE DRAWINGS

The foregoing and other objectives, features, and attendant advantages of the present invention will be more high appreciated as they become better understood by means of the following description and accompanying drawings, wherein;

FIG. 6 is a curve showing the characteristics of a treated thermal paper between the power source voltage and the current duration, for a given concentration or density of the printed color.

FIG. 8 is an explanatory diagram of operation of the apparatus in FIG. 7, and

FIG. 9 is the modification of the power circuit in the thermal recording system in FIG. 7.

DESCRIPTION OF THE PREFERRED EMBODIMENTS

First, the characteristics of a treated thermal paper will be described in accordance with FIGS. 4 through 6.

Figure 4:
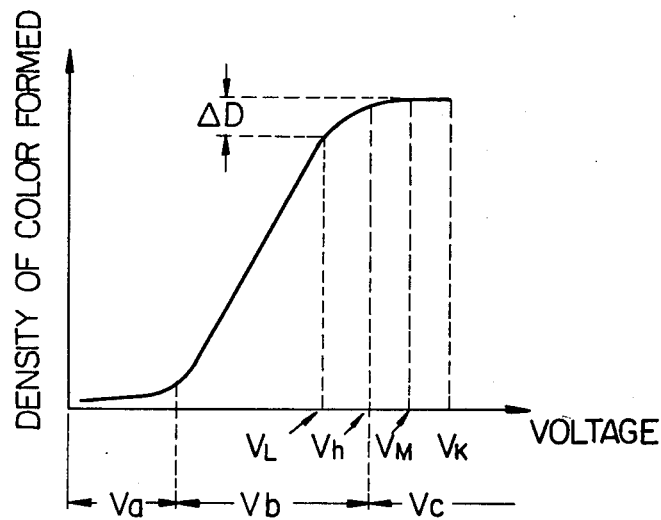
FIG. 4 is a curve showing the characteristics of a treated thermal paper between the concentration or density of the printed color and the power source voltage.

FIG. 4 shows the relationship between the effective value of the voltage at the power source terminal 2 (abscissa) and the density of color formed on a thermal recording paper (ordinate), provided that the heat time of resistance element is constant. In the voltage range $V_a$, there is little color formation on a thermal paper. As the voltage enters the range $V_b$, the density of color formed varies almost in proportion to the magnitude of the effective value of the voltage, while the color density is saturated in the range $V_c$ exceeding a specific level $V_h$. If the voltage is raised up to $V_k$, the thermal head may be broken. The breakage of the thermal head is due to the collapse of the heat-generating resistor elements 1, the collapse of the anti-oxidation anti-friction film provided between the resistance elements 1 and the recording paper. Breakdown of the thyristors 3 is caused by overvoltage in excess of the withstand voltage thereof and other causes. As regarding the service life of the thermal head excluding the aforesaid breakage, it has been confirmed by measurements that the service life depends on the voltage applied thereto, and the lower the applied voltage is the longer the service life will be. Thus, it is desirable to use the thermal head at a voltage which does not exceed the level $V_h$ very far. Accordingly, the recording machine is generally so organized as to keep the effective value of the voltage at the power source terminal 2 of the thermal head at the level of $V_h$. The commercial power source voltage, however, fluctuates due to various reasons, with the range of the fluctuation amounts to ±10 to 15%. In FIG. 4, $V_L$ represents the lowest level of the aforesaid fluctuation, while $V_M$ represents the highest level of the fluctuation, so that the effective value of the voltage at the power source terminal 2 fluctuates between $V_L$ and $V_{M'}$ resulting in a variation $\Delta D$ of the density of the color formed for recording.

Figure 5:
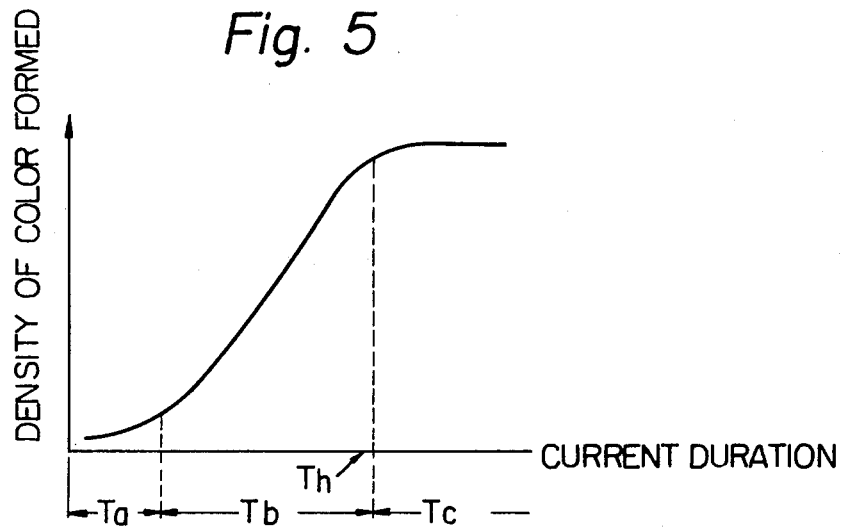
FIG. 5 is a curve showing the characteristics of a treated thermal paper between the concentration or density of the printed color and the current duration applied to a thermal head.

FIG. 5 shows the relationship between duration of the current (abscissa) through the heat-generating resistor elements 1 (FIG. 1) in the thermal head and the density of the color formed, as shown on the ordinate, provided that the voltage is constant. For the current duration $T_a$, there is little color formation on the recording paper. And for the current duration in the range $T_b$, the density of the color formed varies almost in proportion to the current duration. When the current duration exceeds $T_h$ and enters into the long duration range $T_c$, the density of the color formed is saturated.

FIG. 4 assumes a constant duration of heating and FIG. 5 assumes a constant power source voltage. So that if the current duration is shortened in FIG. 4, the curve of the graph of the figure moves to the right as seen in the figure, so that the levels of the voltage $V_h$ and $V_k$ are raised. Furthermore, the variation of the density of the color formed due to the power source voltage fluctuation can be compensated for by changing the current duration.

FIG. 6 illustrates the relationship between the power source voltage and the current duration for achieving a given constant density of the color formed. It is apparent from the figure that, when the power source voltage is high, the desired constant density of the color formed can be achieved by reducing the current duration.

Figure 1:
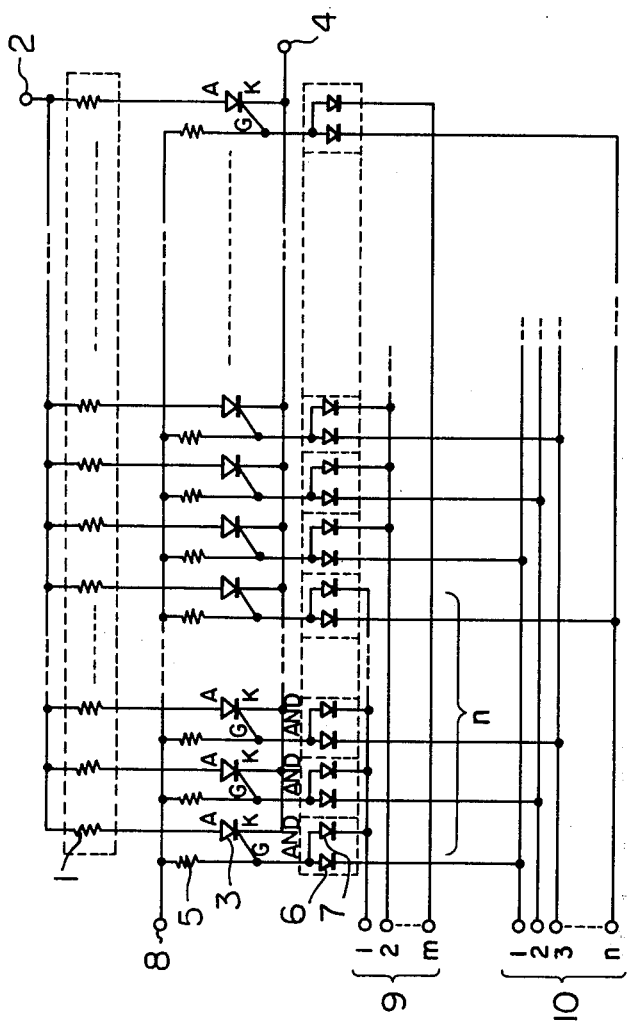
FIG. 1 is a circuit diagram of a thermal head.

Accordingly, it should be noted from the above explanation, that the desired concentration of printed color can be obtained even when the voltage of the power source is changed, by controlling the time of heating the resistance element 1 in FIG. 1 in accordance with FIG. 6. This control is accomplished by the circuit shown in FIG. 7.

Figure 2:
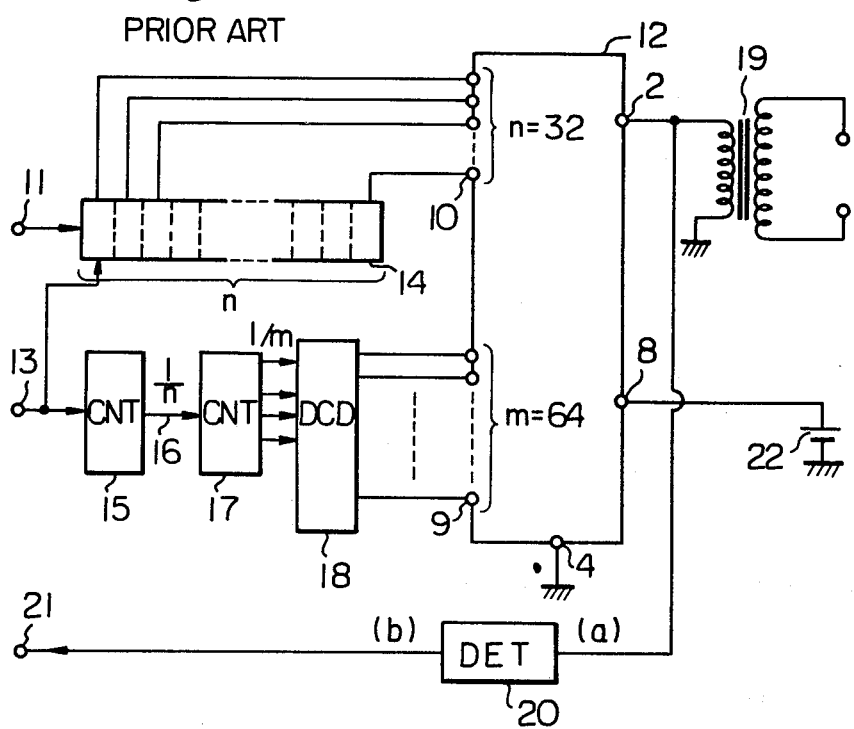
FIG. 2 is a block diagram of a conventional thermal recording system.
Figure 7:
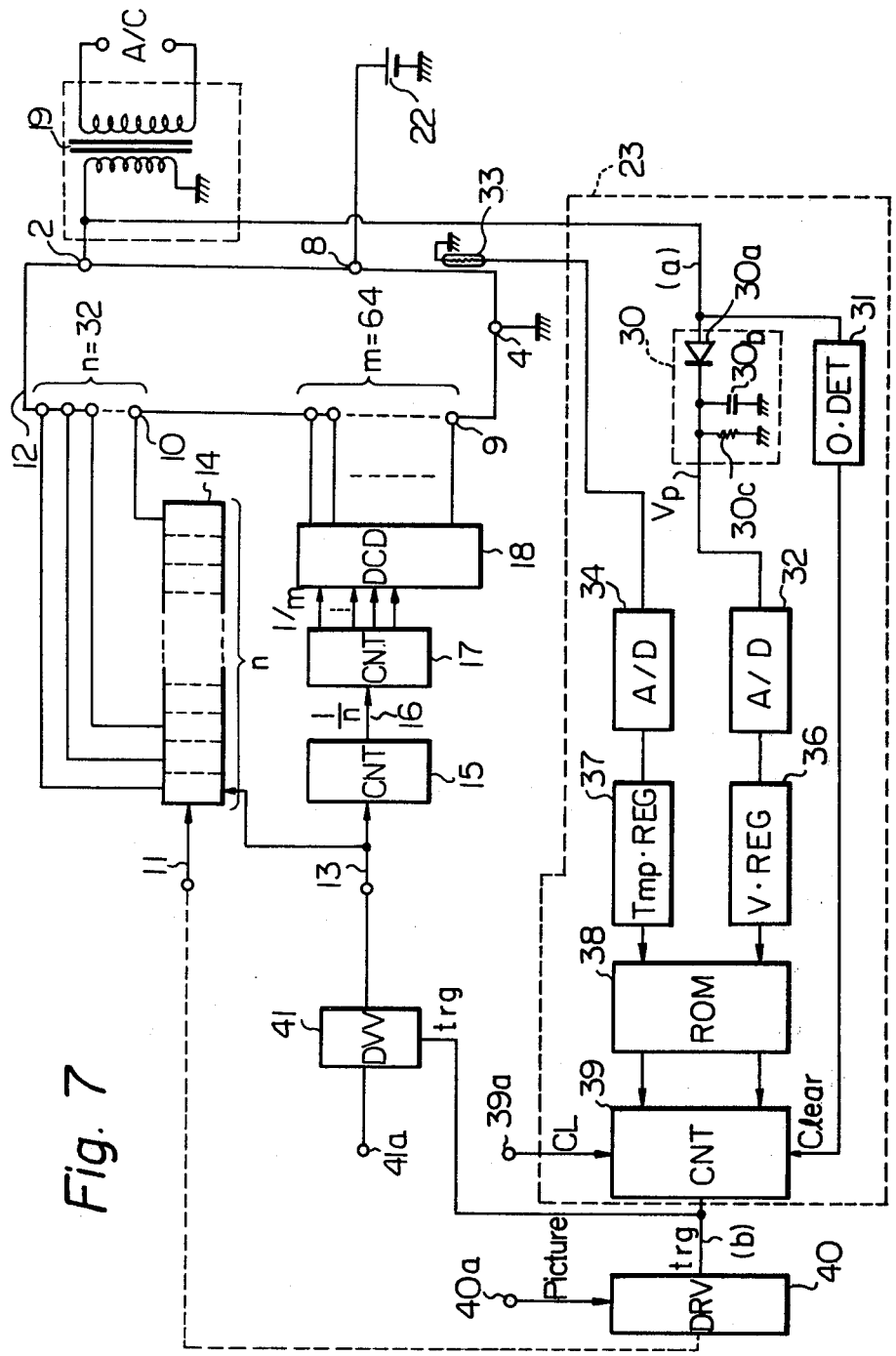
FIG. 7 is a block diagram of an embodiment of the thermal recording system, according to the present invention.

FIG. 7 shows the block diagram of an example of the thermal recording system according to the present invention. The important feature of the apparatus in FIG. 7 is the presence of the time control unit 23, which replaces the simple detector circuit 20 in FIG. 2. Since the structure and operation of the apparatus in FIG. 7 are the same as those in FIG. 2 except for the presence of the time control unit 23, detailed explanation will be limited to the time control unit 23.

FIG. 8 shows waveforms for explaining the operation of the circuit of FIG. 7. The curve (a) of FIG. 8 is the waveform of the voltage applied to the power source terminal 2 of the thermal head, in which the period is $T_o$. If the frequency of the commercial power source voltage is 50 Hz, then $T_O=20$ mS. The signal at the power source terminal 2 is applied to both the peak voltage detector 30 and the zero voltage detector 31. The former is consisted of the diode 30a and the capacitor 30b connected between the output of the diode 30a and the ground. The resistor 30c is connected parallel to the capacitor 30b. It is apparent to those skilled in the technology that the output of the peak voltage detector 30 provides the peak value $V_p$ of the voltage at the terminal 2. The peak value $V_p$ is applied to the analog-digital converter 32, and said analog-digital converter 32 converts the peak value $V_p$ in an analog form to a digital form having the value $V_p$. The converted digital value $V_p$ is then applied to the voltage registor 36.

By the way, the concentration or density of the printed color also depends upon the temperature of the thermal head and the thermal paper, so the duration that the thermal head is conducted should also be controlled in accordance with the temperature of the thermal head and/or the thermal paper. Said temperature is sensed by the thermister 33 mounted near the thermal head 12, and the output of the thermister 33 is applied to the other analog-digital converter 34, which provides the digital value of the temperature to the temperature registor 37.

The voltage registor 36 and the temperature registor 37 provide the address of the read-only-memory 38, which stores the table for providing the optimum delay time $\Delta t$ from the zero point of the power source to the start time that the heating of the thermal head begins. The output of the read-only-memory 38 is transferred to the counter 39, the content of which is descreased one by one by a clock pulse applied to the terminal 39a. Said counter 39 is reset to zero beforehand by the output of the zero voltage detector 31, when the instantaneous power supply voltage becomes zero. Since the clock pulse at the terminal 39a decreases the content of the counter 39, the content of the same will reach zero. And when the content of the counter 39 reach zero, the counter 39 provides the output pulse as shown in FIG. 8(b). The delay time that the pulse in FIG. 8(b) appears is defined by the content of the read-only-memory 38. It should be noted that the position of the pulse in FIG. 8(b) on the time axis (abscissa) can vary from the position of the waveform in FIG. 8(c) to that of the waveform in FIG. 8(d).

As apparent from the above explanation, the time control unit 23 converts the peak value $V_p$ of the power supply to the time delay $\Delta t$. In other words, when the peak value $V_p$ is high, the delay time $\Delta t$ is long, and when the peak value $V_p$ is low, the delay time $\Delta t$ is short.

When the counter 39 provides the output signal, the driver circuits 40 and 41 are triggered. The former driver circuit 40 provides the picture signal at the terminal 40a to the shift register 14 through the terminal 11, and the latter driver circuit 41 provides the clock signal at the terminal 41a to the counter 15 and the shift register 14 through the terminal 13.

It is possible in practice to accurately measure the relationship between the peak value $V_p$ and/or the temperature and the delay time $\Delta t$, for given thermal head, so that the magnitude of the delay time $\Delta t$ can be easily controlled for different peak values $V_p$ and temperature by storing the last mentioned relationship as shown in FIG. 6 in a read-only-memory 38.

FIG. 8(e) shows the time $t_l$ that the thermal head is actually heated. The time $t_l$ begins when the pulse in FIG. 8(b) appears, and finishes when the power source voltage reaches below $V_l$.

In the previous mentioned explanation, the peak value $V_p$ of the voltage at the power source terminal 2 is detected, but similar effects can be achieved by detecting the current flowing into the power source terminal 2. This is because of the fact that the resistance value of the heat-generating registance element 1 is constant, so that the amount of the heat generated (namely, the density of the color formed) is proportional to the square of the voltage or the current. However, care should be paid to the number of the heat-generating resistor elements fed from the power source terminal 2 (or the number of color dots to be formed), because the magnitude of the current depends on such a number, and a suitable correction is necessary for the number. It is also possible to detect both the voltage and the current for determining the power, so that the desired control can be carried out by the power thus determined.

Figure 3:
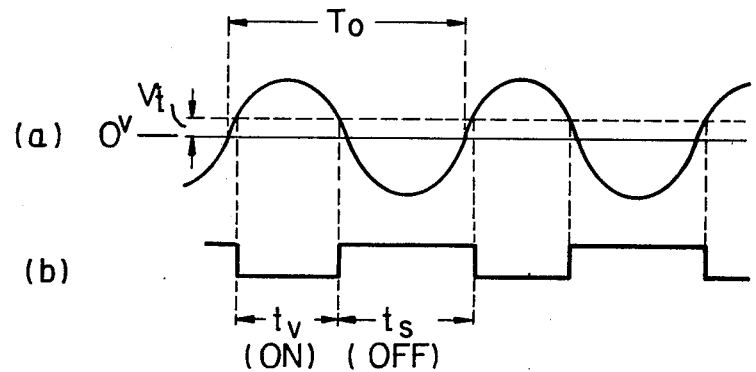
FIG. 3 is an explanatory diagram of the waveform showing the commercial power source and the operation of the thermal head in case of the conventional thermal recording system in FIG. 2.

In the mentioned example, the control of the delay time ($\Delta t$) is applied to the dot which is to be recorded in that cycle which immediately follows the time (cycle)

of detecting the voltage wave crest value $V_p$. This approach is good because the fluctuation of the commercial power source voltage does not occur at a very quick period. Furthermore, if the elements for holding the current through heat-generating resistor elements in the thermal head are not thyristors, but are those current-interrupting elements which can control the current interruption by gates or the like, for instance, GTO (gate turn off) and flip-flop circuits, then the time for triggering the current-interrupting elements can be fixed at the falling moment of the waveform in FIG. 3(a). Then, the rear moment of the heating is controlled in accordance with the peak value $V_p$.

In regarding the voltage variation at the transformer 19 or the internal impedance of the commercial power source due to the current therethrough, it is possible to control the mentioned delay time $\Delta t$ by considering the voltage increment or decrement due to the change in the number of dots with which color should be formed in each cycle (for a large number of dots to be colored, the current will be large and a large voltage drop may be caused at the power source terminal 2).

It should also be noted that the power source is not restricted to the commercial AC voltage, but a full-wave rectified voltage can be used too. In this case, the transformer circuit 19 in FIG. 7 is replaced to the circuit 19a shown in FIG. 9. The modified transformer circuit 19a in FIG. 9 comprises of the transformer 40 and a pair of diodes 41 and 42 for the full-wave rectification. The output of the diodes 41 and 42 are connected together, and in turn are connected to the power source terminal 2 of the thermal head. The diodes 41 and 42 are also connected to the input of the time control unit 23. Since the apparatus in FIG. 9 utilizes a full-wave rectified waveform for heating the thermal head, the thermal head can be heated in every 10 mS, while the thermal heater in FIG. 7 is heated in every 20 mS since only the positive half cycle is utilized for the heating in FIG. 7. Therefore, the embodiment in FIG. 9 can provide quicker printing in a thermal head printer.

As described in this text, the thermal recording system according to the present invention is free from the density unevenness due to fluctuation of the power source voltage, and the construction is very simple because of the fact that only the time control unit 23 in FIG. 7 is enough to eliminate the unevenness of the concentration or density. Therefore, it becomes possible to provide an inexpensive high-speed thermal recording system of compact construction, yet being capable of producing high quality printing.

From the reading of this text it should now be apparent that a new and improved thermal recording system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A thermal recording system comprising of:
    (a) a thermal head having a plurality of aligned heat-generating resistor elements, in contact with a treated thermal paper with current-holding elements corresponding to each of the heat-generating resistor elements for holding electric current.
    (b) means for applying picture information to said heat-generating resistor elements and current-holding elements in accordance with the picture information to be recorded.
    (c) a power source for providing periodic electric power to the said thermal head under the control of a control means, characterized in that said control means comprises of;
        (i) a peak voltage detector for detecting the peak value of said periodic electric power,
        (ii) register means for storing the digital value of said peak value,
        (iii) a read-only-memory for storing the table for providing the desired delay time in accordance with said peak value, the address of said read-only-memory being defined by the output of said register means,
        (iv) counter means the initial value of which is provided by the output of said read-only-memory and the content of said counter means is decreased one after another by a predetermined clock pulse, and the output of said counter means controls the power supply to the thermal head.

2. A thermal recording system according to claim 1 wherein said power source is an alternate current power source.

3. A thermal recording system according to claim 1 wherein said power source is on full-wave rectified power source.

4. A thermal recording system according to claim 1 wherein said current-holding element is a controlled rectifier.

5. A thermal recording system according to claim 4 wherein said control rectifier is a silicon controlled rectifier (SCR).

6. A thermal recording system according to claim 1, wherein the address of said read-only-memory is modified by the temperature of the thermal head.

* * * * *